United States Patent [19]

Saito

[11] Patent Number: 5,343,892

[45] Date of Patent: Sep. 6, 1994

[54] PIPE COUPLING

[75] Inventor: Shunichi Saito, Tokyo, Japan

[73] Assignee: Nitto Kohki Co., Ltd., Tokyo, Japan

[21] Appl. No.: 93,147

[22] Filed: Jul. 10, 1993

Related U.S. Application Data

[63] Continuation of Ser. No. 948,640, Sep. 23, 1992, abandoned.

[30] Foreign Application Priority Data

Jan. 9, 1992 [JP] Japan .......................... 4-000339[U]

[51] Int. Cl.$^5$ ............................................ F16L 37/28
[52] U.S. Cl. .................. 137/614.04; 285/316
[58] Field of Search .............. 137/614, 614.02, 614.04; 285/316, 315, 317

[56] References Cited

U.S. PATENT DOCUMENTS

| 4,026,581 | 5/1977 | Pasbrig | 285/316 X |
| 4,485,845 | 12/1984 | Brady | 137/614.04 |
| 5,120,085 | 6/1992 | Shin | 285/317 |
| 5,144,979 | 9/1992 | Shobuzako et al. | 137/614.04 |

FOREIGN PATENT DOCUMENTS 62-258288 11/1987 Japan .
3-69392 7/1991 Japan .

*Primary Examiner*—Martin P. Schwadron
*Assistant Examiner*—Kevin L. Lee
*Attorney, Agent, or Firm*—Nixon & Vanderhye

[57] ABSTRACT

A freely-detachable pipe coupling comprising a socket having plural slits each formed at a plug-connected front end area of the socket, extending in the circumferential direction of the socket, and also having stopper members each capable of coming into and out of its corresponding slit in the radial direction of the socket, a plug having a stopper groove round it to elastically stop and hold the plural stopper members therein and also having a portion whose outer diameter is substantially equal to the inner diameter of that plug-connected front end of the socket where the slits are formed, said portion of the plug serving to partly project the stopper members outside from the slits of the socket before the plural stopper members are elastically stopped and held in the stopper groove, and a sleeve freely slidably fitted onto the plug and forwarded to press the stopper members to the axial center of the socket, when the plug is pushed into the socket, to thereby elastically stop and hold the stopper members in the stopper groove of the plug, wherein each of the slits has a guide groove which is formed on the inner face of the socket, extending, parallel to the axial line of the socket, from a front side of the slit, and each of the stopper members has a stopper projection shiftable in the guide groove in the radial direction of the socket.

6 Claims, 3 Drawing Sheets

PIPE COUPLING

This is a continuation of application Ser. No. 07/948,640, filed Sep. 23, 1992, now abandoned.

BACKGROUND OF THE INVENTION

1. Field of the Invention

The present invention relates to a pipe coupling comprising a socket provided with stopper members which are fitted in their corresponding slits formed at the plug-connected front end of the socket so as to freely come into and out of the slits in the radial direction of the socket, and a plug provided with a stopper groove round it, wherein the plug can be freely detachably connected into the socket by stopping or holding the stopper members in the stopper groove by means of a sleeve fitted on the plug.

2. Description of the Related Art

In the case of pipe couplings of this kind, the slits formed at the plug-connected front end of the socket and the stopper members fitted in the slits are usually arranged to prevent the stopper members from coming out of the socket into it. However, they are not arranged to prevent the stopper members from coming out of the socket outside it. In order to prevent the stopper members from coming out of the socket outside it, therefore, the sleeve fitted on the socket is used. The sleeve achieves two functions of pressing the stopper members to connect the plug into the socket and of preventing them from coming out of the socket outside it.

According to the conventional pipe couplings, their automatic assembling becomes impossible and their assembling work becomes troublesome because the stopper members cannot be held in the slits in the course of their being assembled. Further, when it is intended that the connection of the socket and the plug can be instantly made by one hand, their structure becomes complicated, thereby making their assembling work more troublesome and their cost higher.

SUMMARY OF THE INVENTION

The present invention is therefore intended to eliminate the above-mentioned drawbacks.

Accordingly, the object of the present invention is to provide a pipe coupling wherein stopper members in slits formed at the plug-connected front end of a socket can be prevented from coming out of the slits and outside the socket to make the pipe coupling automatically assembled, its structure simpler although its connection can be instantly achieved by one hand, and its cost lower.

This object of the present invention can be achieved by a pipe coupling comprising a socket provided with stopper members which are fitted in their corresponding slits formed at the plug-connected front end of the socket to freely project from tops and bottoms of the slits in the radial direction of the socket, a plug provided with a stopper groove round it, and a sleeve fitted on the plug serving to stop or hold the stopper members of the socket in the stopper groove of the plug so as to freely detachably connect the plug into the socket, wherein a guide groove is formed on the inner face or circumference of the socket, extending, parallel to the axial line of the socket, from a front side of each of the slits, each of the stopper members has a stopper projection fitted in its corresponding guide groove, and the sleeve attached to the plug is urged in a direction, in which the plug is pushed into the socket, by a spring so as to freely slide along the plug.

The guide groove is formed on the inner face of the socket, extending, parallel to the axial line of the socket, from the front side of each of the slits and each of the stopper members fitted in the slits has the stopper projection shiftable in its corresponding guide groove. The stopper members fitted in the slits, therefore, can be projected, within the depth of the guide grooves, from tops and bottoms of the slits in the radial direction of the socket. When the stopper projections of the stopper members are struck against the tops of the guide grooves, therefore, the stopper members can be prevented from further moving in the radial direction of the socket. This enables the stopper members to be prevented from coming out of their corresponding slits and outside the socket and they can be thus held in the slits. When it is arranged that the stopper members are made of elastic synthetic resin, they are forced into their corresponding slits to position their stopper projections in the guide grooves, therefore, the assembling of the pipe coupling can be made automatic.

Further, the sleeve is fitted on the plug so as to freely slide along it in the direction in which the plug is pushed into the socket. When the stopper groove on the plug comes under the stopper members of the socket while pushing the plug into the socket, therefore, the stopper members are pressed in the radial direction of the socket by the sleeve, so that they can be stopped and held in the stopper groove round the plug. The connecting of the plug into the socket can be thus finished.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
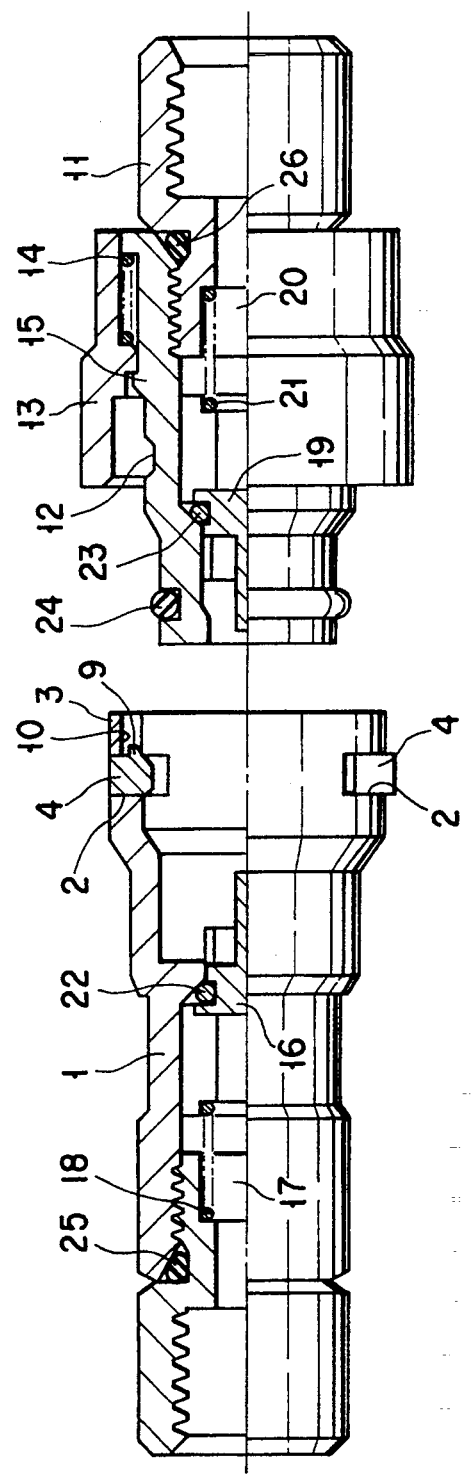
FIG. 1 is a side view showing an embodiment of the present invention partly sectioned.

The present invention will be described in detail referring to an embodiment of the present invention shown in the drawings.

In the drawings, reference numeral 1 represents a socket and 2 slits each formed in the socket 1, partly extending in the circumferential direction of the socket 1, and at that end thereof into which a plug 11 is fitted and connected. A guide groove 3 is formed, parallel to the axial center line of the socket 1, on the inner face of the socket 1 and on one side of each of the slits 2 when viewed in the axial direction of the socket 1. Reference numeral 4 denotes arc-shaped stopper members each fitted, freely shiftable in the radial direction of the socket 1, in each of the slits 2. The thickness of each of the stopper members 4 is larger than the thickness of that area of the socket 1 where the slit 2 is formed. It is preferable that the socket 1 is provided with plural sets of the stopper members 4 and the slits 2 formed point-symmetrical to each other relative to the center of the socket 1.

Figure 2:
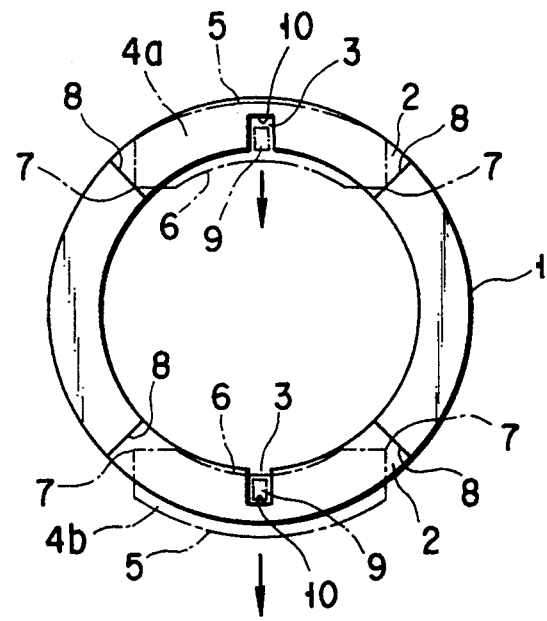
FIG. 2 is a sectional view showing the main portion of the front end of a socket enlarged.
Figure 3:
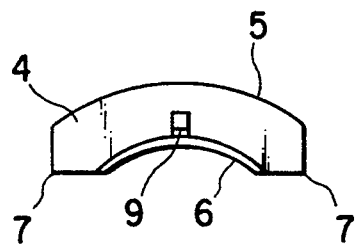
FIG. 3 is a front view showing a stopper member enlarged.
Figure 4:
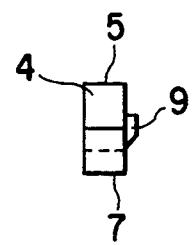
FIG. 4 is a side view showing the stopper member.

When the top 5 of each stopper member 4 becomes same in level as the outer face of the socket 1 and the bottom 6 thereof becomes projected into the socket 1 from the inner face of the socket 1 while each stopper member 4 is being shifted into the socket 1 in the radial direction thereof, both side ends 7 of each stopper member 4 are stopped by those side walls 8 of each slit 2 which extend in the radial direction of the socket 1, thereby preventing the bottom 6 of each stopper member 4 from being further projected into the socket 1 (see 4a in FIG. 2). Reference numeral 9 represents stopper projections each projected from the front side of each stopper member 4 into each guide groove 3 which is formed on the inner face of the socket 1, extending from the front side of each slit 2 in the axial direction of the socket 1. The stopper projection 9 can be freely shifted in the guide groove 3 in the radial direction of the socket 1 and when the bottom 6 of each stopper member 4 becomes same in level as the inner face of the socket 1 and the top 5 thereof becomes projected from the outer face of the socket 1 while each stopper member 4 is being shifted in the radial direction of the socket 1, each stopper projection 9 is stopped by the top wall 10 of each guide groove 3, thereby preventing each stopper member 4 from being further shifted or coming out of the slit 2 outside the socket 1 (see 4b in FIG. 2).

The stopper members 4 are made of synthetic resin and, using the elasticity of this resin, they are pressed from outside into their corresponding slits 2 while fitting their stopper projections 9 into the guide grooves 3.

Reference numeral 11 denotes the plug and 12 a stopper groove formed round the plug 11. Reference numeral 13 represents a sleeve fitted, freely slidable in the axial direction of the plug 11, onto the plug 11. Reference numeral 14 denotes a spring for urging the sleeve 13 in the direction in which the plug 11 is connected into the socket 1. Reference numeral 15 represents a stopper step for preventing the sleeve 13 from coming out of the plug 11. When the plug 11 is pushed into the socket 1, the sleeve 13 is fitted onto the socket 1 and when the stopper groove 12 round the plug 11 reaches the stopper members 4 in the slits 2 of the socket 1, this sleeve 13 pushes the stopper members 4 in the radial direction of the socket 1 to seat them in the stopper groove 12, thereby preventing them from coming out of the stopper groove 12.

Reference numeral 16 represents a valve located in a fluid passage 17 of the socket 1 to open and close the passage 17; 18 a spring for urging the valve 16 to close the passage 17; 19 a valve located in a fluid passage 20 of the plug 11 to open and close the passage 20; and 21 a spring for urging the valve 19 to close the passage 20. When the plug 11 is connected to the socket 1, the valves 16 and 19 are struck and pushed against each other, so that they can be retreated against the springs 18 and 21 to open the fluid passages 17 and 20.

It will be described how the above-described socket 1 and plug 11 can be connected to each other.

Figure 5:
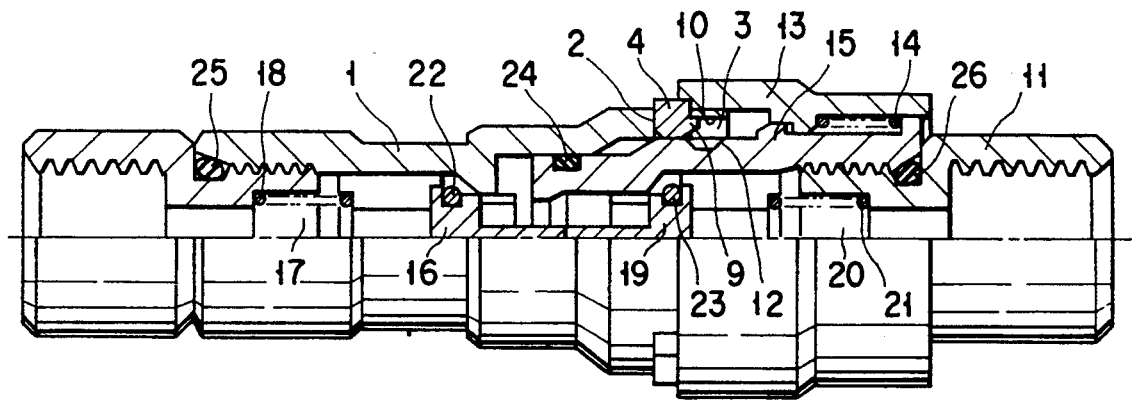
FIG. 5 is a side view showing the socket and its corresponding plug partly sectioned while they are being connected to each other.

When the plug 11 is pushed into the socket 1, the stopper members 4 are forced to project their tops 5 from the outer face or circumference of the socket 1 in the radial direction of the socket 1 by the outer face or circumference of the plug 11 because that area of the plug 11 which comes under the stopper members 4 of the socket 1 has an outer diameter same as the inner diameter of the socket 1. The sleeve 13 is fitted onto the socket 1 as the plug 11 is pushed into the socket 1, and it is struck against the tops 5 of the stopper members 4, which has been projected from the outer circumference of the socket 1, not to further advance along the outer circumference of the socket 1 but to retreat against the spring 14 (see FIG. 5).

Figure 6:
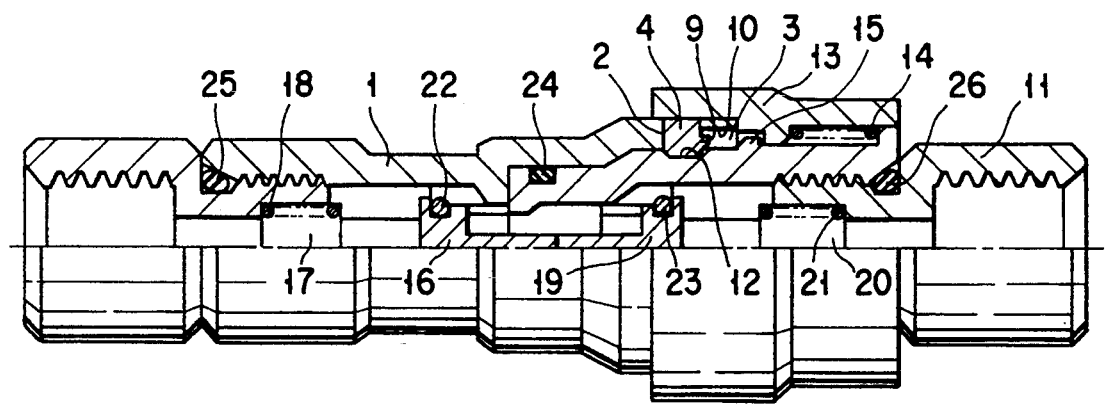
FIG. 6 is a side view showing the socket and its corresponding plug partly sectioned while they are connected to each other.

When the plug 11 is further pushed into the socket 1 and the stopper groove 12 round the plug 11 comes under the stopper members 4 of the socket 1, the stopper members 4 which are under the pressure of the sleeve 13 are forced in the radial direction of the socket 1 to project their bottoms 6 into the socket 1 and seat them in the stopper groove 12 round the plug 11. The sleeve 13 is therefore forwarded by the spring 14 to press the tops 5 of the stopper members 4 downwards by its underside. The stopper members 4 can be thus prevented from coming out of the stopper groove 12 round the plug 11 and the connecting of the plug 11 into the socket 1 can be finished accordingly (see FIG. 6). When the plug 11 is to be disconnected from the socket 1, the sleeve 13 may be retreated from its position shown in FIG. 6 to its position shown in FIG. 5 and outside the socket 1 against the spring 14.

According to the above-described pipe coupling of the present invention, the stopper members are fitted and held in the slits each formed at that front end area of the socket into which the plug is pushed, and the plug can be prevented from coming out of the socket by these stopper members. When the stopper members are made of synthetic resin and, using their elasticity, it is arranged that they are forced into the slits to position their stopper projections in the guide grooves, therefore, the assembling of the socket can be made automatic. In addition, the plug is provided with the sleeve which can press the stopper members into the socket when the plug is pushed into the socket. Therefore, the pipe coupling can be made simpler in structure and it can make it easier to connect the plug into the socket. Further, its assembling can be made easier while its cost can be made lower.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A freely-detachable pipe coupling comprising:
   a socket having plural slits each formed at a plug-connected front end area of the socket, extending in the circumferential direction of the socket, and also having stopper members each capable of coming into and out of its corresponding slit in the radial direction of the socket;

a plug having a circumferential surface and a circular stopper groove formed therein to elastically stop and hold the plural stopper members therein and also having a portion having an outer diameter substantially equal to the inner diameter of that plug-connected front end of the socket where the slits are formed, said portion of the plug serving to partly project the stopper members outwards from the slits of the socket before the plural stopper members are elastically stopped and held in the stopper groove; and a sleeve freely slidably fitted on the plug and biased forward to press the stopper members to the axis of the socket, when the plug is pushed into the socket, to thereby elastically stop and hold the stopper members in the stopper groove of the plug;

wherein each of the slits has a guide portion in the inner face of the socket, extending, parallel to the axial line of the socket, from a front side of the slit, and each of the stopper members has a stopper projection movable in the guide portion in the radial direction of the socket.

2. The freely-detachable pipe coupling according to claim 1, wherein each of said stopper members is arc-shaped and made of elastic synthetic resin.

3. The freely-detachable pipe coupling according to claim 1, wherein the slits holding corresponding stopper members are located in a circle and symmetrical relative to the center of the socket.

4. The freely-detachable pipe coupling according to claim 1, wherein said sleeve is elastically biased forward along the outer circumference of the socket when the plug is pushed into the socket.

5. The freely-detachable pipe coupling according to claim 1, wherein said sleeve is retreated from the socket against the biased elasticity when the plug is disconnected from the socket.

6. The freely-detachable pipe coupling according to claim 1, wherein said socket and said plug have valves, and the valves are struck against each other and retreated in the socket and the plug against valvesurging elasticity, when the plug is pushed into the socket, so that fluid passages in the socket and the plug are opened and communicated with each other.

* * * * *